US012305813B2

(12) United States Patent
Artusi

(10) Patent No.: US 12,305,813 B2
(45) Date of Patent: May 20, 2025

(54) HIGH-PRESSURE CYLINDER WITH CORE IN PLASTIC MATERIAL AND SURFACE COVERING IN COMPOSITE MATERIAL AND RELATED METHOD OF PRODUCTION

(71) Applicant: CARBON CYLINDER S.R.L., Mira (IT)

(72) Inventor: Giovanni Artusi, Mira (IT)

( * ) Notice: Subject to any disclaimer, the term of this patent is extended or adjusted under 35 U.S.C. 154(b) by 34 days.

(21) Appl. No.: 18/264,474

(22) PCT Filed: Jan. 26, 2022

(86) PCT No.: PCT/EP2022/051778
§ 371 (c)(1),
(2) Date: Aug. 7, 2023

(87) PCT Pub. No.: WO2022/199906
PCT Pub. Date: Sep. 29, 2022

(65) Prior Publication Data

US 2024/0044456 A1 Feb. 8, 2024

(30) Foreign Application Priority Data

Mar. 22, 2021 (IT) ........................ 102021000006806

(51) Int. Cl.
*F17C 13/04* (2006.01)

(52) U.S. Cl.
CPC ...... *F17C 13/04* (2013.01); *F17C 2201/0109* (2013.01); *F17C 2203/0604* (2013.01);
(Continued)

(58) Field of Classification Search
CPC .............. F17C 13/04; F17C 2201/0109; F17C 2203/0604; F17C 2203/0619;
(Continued)

(56) References Cited

U.S. PATENT DOCUMENTS 5,287,988 A * 2/1994 Murray ..................... F17C 1/16
220/589
8,186,536 B2 5/2012 Strack
(Continued)

FOREIGN PATENT DOCUMENTS

CN 111609305 A * 9/2020
JP H10332084 A * 12/1998
WO 2013008719 A1 1/2013

OTHER PUBLICATIONS

English Machine Translation of CN-111609305-A (Year: 2020).*
(Continued)

*Primary Examiner* — Don M Anderson
*Assistant Examiner* — Laura E. Parker
(74) *Attorney, Agent, or Firm* — Egbert, McDaniel & Swartz, PLLC

(57) ABSTRACT

High-pressure cylinder having an internal core in plastic material and a surface covering having one or more layers of composite material, partially incorporating a nozzle in metal material attached to the upper end portion of the neck of the core shaped to receive at least one accessory, such as a tap or a valve, the nozzle being composed of an internal element and an external element which can be screwed one to the other to clamp on the neck, wherein the neck has a slight narrowing of diameter starting from its mouth, such as to determine an internal conical surface suitable for coupling with a corresponding external conical surface of the internal element of the nozzle, and an external conical surface suitable for coupling with a corresponding internal conical surface of a modular ring in plastic or elastomeric material interposed between the neck and the external element of the nozzle.

12 Claims, 8 Drawing Sheets

(52) U.S. Cl.
CPC ........................... *F17C 2203/0619* (2013.01); *F17C 2203/066* (2013.01); *F17C 2205/0305* (2013.01); *F17C 2209/2127* (2013.01)

(58) Field of Classification Search
CPC ........ F17C 2203/066; F17C 2205/0305; F17C 2209/2127
USPC ................................ 220/586, 582, 592, 601
See application file for complete search history.

(56) References Cited

U.S. PATENT DOCUMENTS

| | | | | |
|---|---|---|---|---|
| 2015/0338024 | A1 | 11/2015 | Wata | |
| 2018/0202554 | A1* | 7/2018 | Hogan | F17C 13/06 |
| 2019/0346083 | A1 | 11/2019 | Shubbar et al. | |

OTHER PUBLICATIONS

English Machine Translation of JP-H10332084-A (Year: 1998).*
International Search Report for corresponding PCT/EP2022/051778 dated May 20, 2022.
Written Opinion of the International Searching Authority for corresponding PCT/EP2022/051778 dated May 20, 2022.

* cited by examiner

HIGH-PRESSURE CYLINDER WITH CORE IN PLASTIC MATERIAL AND SURFACE COVERING IN COMPOSITE MATERIAL AND RELATED METHOD OF PRODUCTION

The present invention relates to a cylinder, more particularly for containing fluids (liquid or aeriform) at high pressure, having a core (liner) in plastic material and a surface covering made up of one or more layers of composite material, provided with a nozzle, composed of several parts, shaped to receive at least one accessory, such as, by way of a non-limiting example, a tap or a valve or other.

The invention also relates to a method for producing such a cylinder.

Various types of high-pressure cylinders are known that are obtained from an internal core in metal or plastic material, on which a nozzle in metal material is formed or applied, normally provided with a thread suitable for clamping a tap or a sealing valve. The core is then covered with one or more layers of reinforcing threads which also wrap around the external base of the nozzle.

A critical aspect of these cylinders is represented by the coupling between the neck of the core and the nozzle, especially in the case of a core in plastic material. In fact, at the interface between the plastic material of the core and the surface of the nozzle the pressurised gas tends to produce a delamination with consequent possible leaking.

Various solutions have been proposed to try to limit this problem, none of which has proved completely satisfactory.

U.S. Pat. No. 8,186,536 B2 discloses a boss for use with a vessel. The boss includes a first component adapted to be formed in an opening of the vessel, wherein the first component includes a first coupling element, and a second component including a second coupling element, wherein the second coupling element engages the first coupling element to secure the second component to the first component, and wherein a liner of the vessel is disposed therebetween.

It is, therefore, the object of the present invention to eliminate the disadvantages encountered in the solutions of the prior art.

More particularly, it is an object of the invention to provide a high-pressure cylinder with a core in plastic material and a surface covering in composite material, wherein the nozzle ensures an excellent seal over time under all conditions of use.

A further object of the invention is to provide such a cylinder in which the nozzle can be quickly and safely applied.

Yet another object of the invention is to provide such a cylinder in which a nozzle element suitable for receiving accessories is shaped so as to be removable for possible maintenance work.

These and other objects are achieved by the cylinder according to the invention that has the features of the appended independent claim 1.

Advantageous embodiments of the invention are disclosed in the dependent claims.

Substantially, the high-pressure cylinder according to the invention has an internal core or liner in plastic material and a surface covering constituted by one or more layers of composite material, partially incorporating a nozzle applied to the upper end part of the neck of the core shaped to receive at least one accessory, such as a tap, valve, or other, said nozzle comprising an internal metal element and an external metal element which can be screwed together to tighten on said neck of the core, wherein said core neck has a slight narrowing in diameter starting from its mouth, such as to determine an internal conical surface suitable for coupling with a corresponding external conical surface of the internal element of the nozzle, and an external conical surface suitable for coupling with a corresponding internal conical surface of a modular ring in plastic or elastomeric material placed between said neck and said external element of the nozzle, and wherein said nozzle likewise comprises an annular protective element in plastic or elastomeric material, acting as a bearing, which is interposed between a widened base of the nozzle and the upper part of the core of the container.

The invention also relates to a method of producing the cylinder according to the invention, having the features of claim 8.

Further features of the invention will be made clearer by the following detailed description, referring to a purely illustrative, and therefore non-limiting embodiment thereof, illustrated in the accompanying drawings, wherein:

FIG. 1*a* is a front elevation view of a high-pressure cylinder according to the invention;

FIG. 1*b* is a vertical semi-sectional view of the cylinder of FIG. 1*a;*

FIG. 1*c* is an enlargement of the upper part of FIG. 1*b;*

FIG. 2*a* is a blown-up view of the cylinder of FIG. 1*a* without the external surface covering;

FIG. 2*b* is a median section of FIG. 2*a;*

FIG. 3*a* is a front elevation view, enlarged with respect to the previous ones, of a preform used to form the core or liner of the cylinder;

FIG. 3*b* is a median section of the preform of FIG. 3*a* taken along line A-A;

FIGS. 4*a*-4*f* are partial views in median section showing the various steps of formation of the cylinder;

FIG. 5 is a median section view of the nozzle showing its component parts assembled;

FIGS. 6*a* and 6*b* are, respectively, an axonometric view from above and a median section view of the internal element of the nozzle of FIG. 5;

FIGS. 7*a* and 7*b* are, respectively, an axonometric view from above and a median section view of the external element of the nozzle of FIG. 5;

Figure 1A:
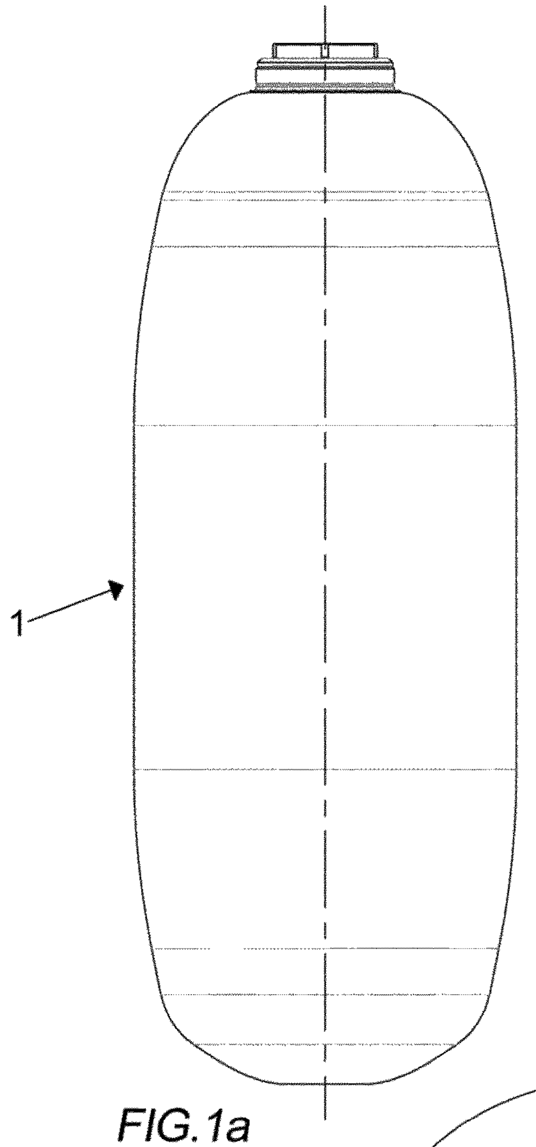
Figure 1B:
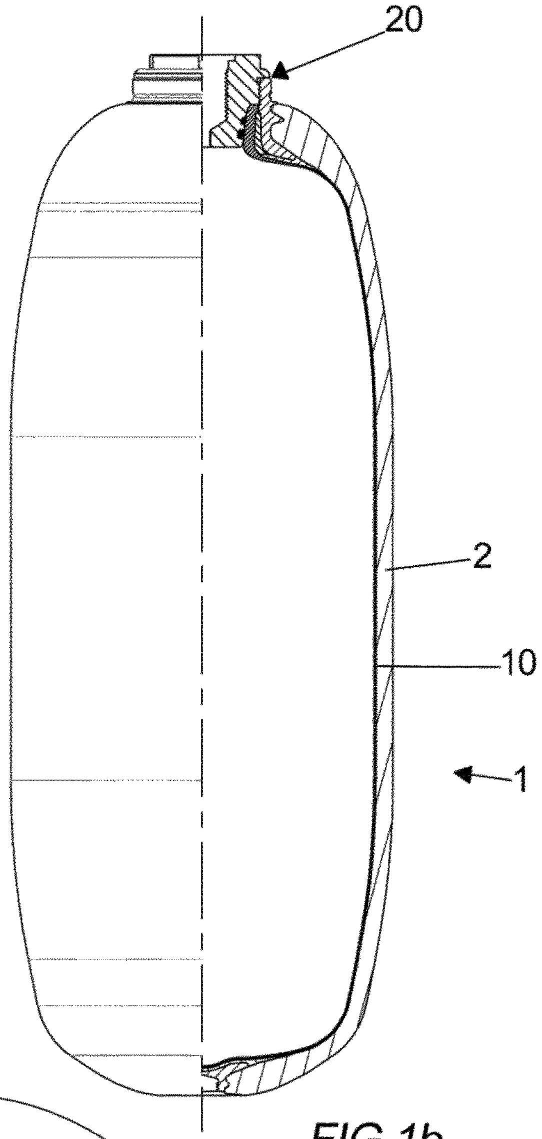
Figure 1C:
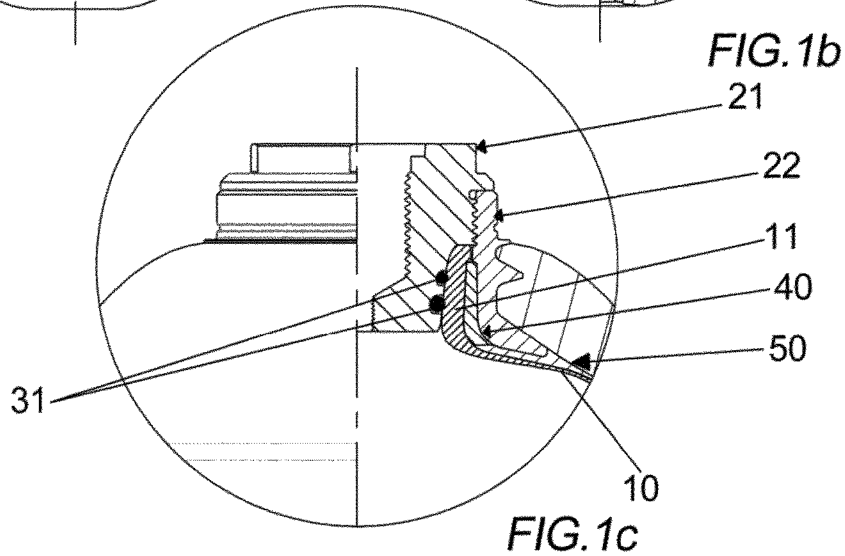
Figure 2A:
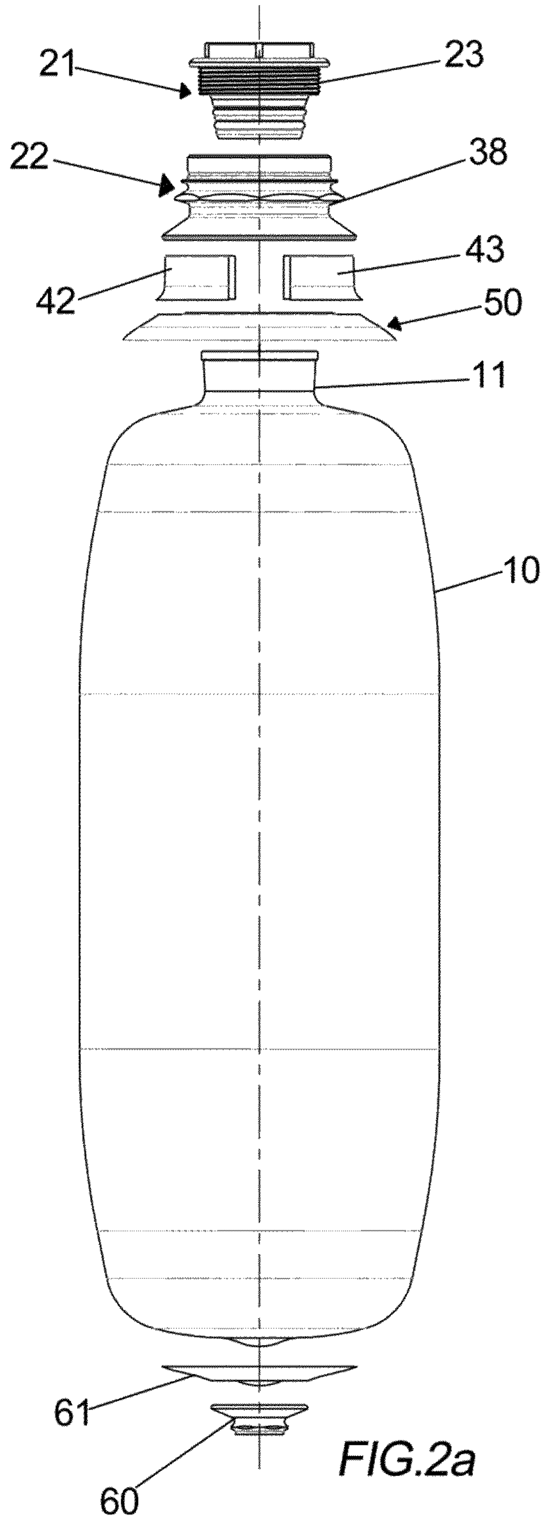
Figure 2B:
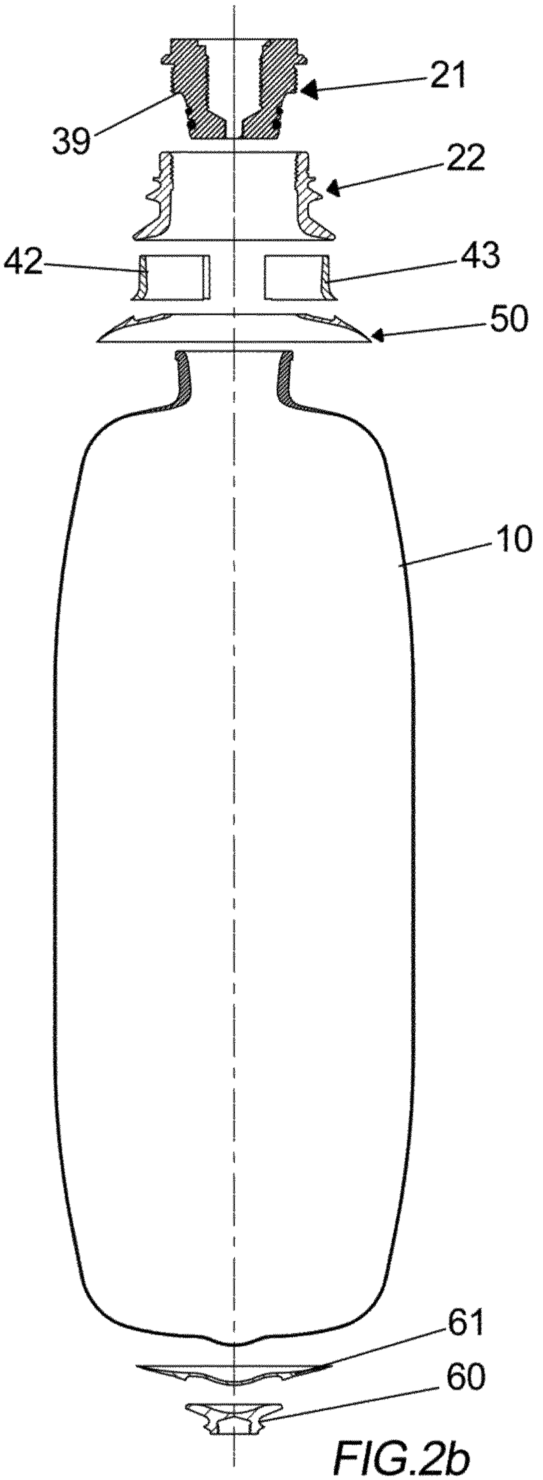

In FIGS. 1*a*, 1*b* the high-pressure cylinder, for containing gases and fluids in general according to the invention, has been denoted by reference numeral 1 and comprises a core or liner 10 made of plastic material, externally covered with a plurality of reinforcing layers in composite material 2, such as, by way of non-limiting example, carbon or KEVLAR™ or mixed fibre threads embedded in synthetic resins partially incorporating a nozzle 20 with parts in metal and plastic material, applied to the end portion/upper orifice of the neck 11 of the core 10.

More particularly, the nozzle 20 is made up of four coaxial annular elements:

- an internal metal element 21 bearing in the upper part an external thread 23;
- an external metal element 22 bearing in the upper part an internal thread 24, so that the elements 21, 22 can be screwed together, tightening on the end part of the neck 11 of the core, as will be explained in greater detail here below;

a ring in plastic or elastomeric material 40 interposed between the neck 11 of the core and the external element 22; and an element in plastic or elastomeric material 50 placed under the external element 22.

Figure 6A:
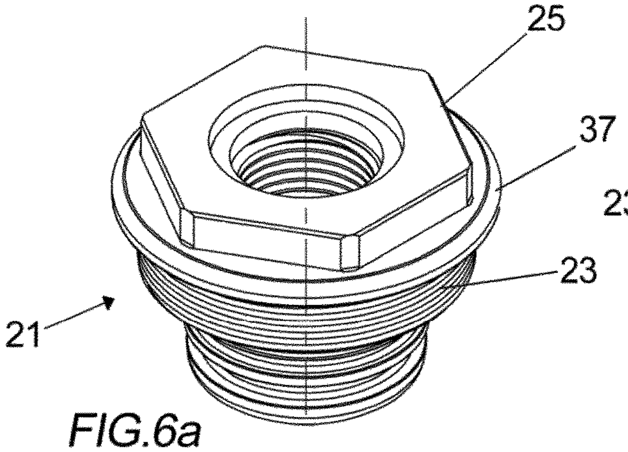
Figure 6B:
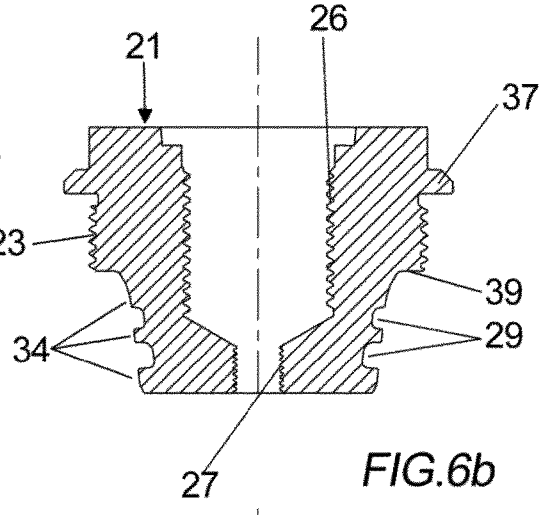
Figure 7A:
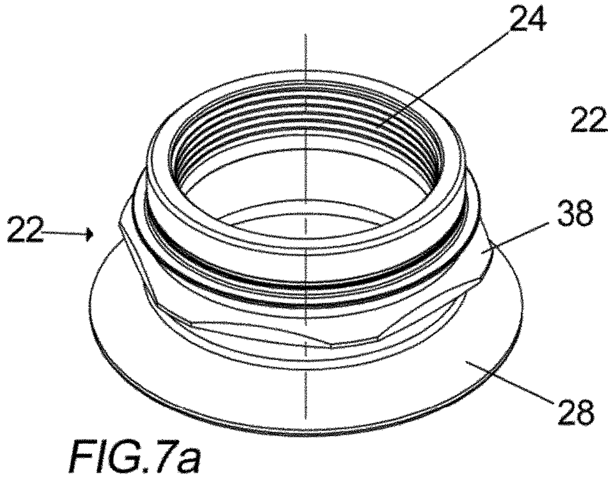
Figure 7B:
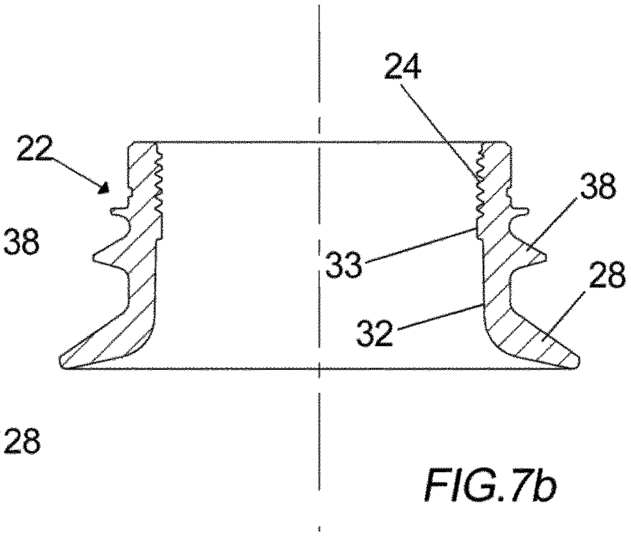

The internal element 21 has a head 25 suitably shaped, for example of a hexagonal type, as shown in the example of FIG. 6*a*, or of another shape, for the engaging of a tightening key, and an annular protrusion 37 that abuts against the upper edge of the external element 22.

In a manner in itself known, a thread 26 is provided on the upper internal part of the internal element 21 for mounting/locking a valve or tap, or any other accessory, suitable for dispensing the fluid contained in the cylinder 1. Optionally, on the lower internal part of the internal element 21 a second thread 27 can be provided, for mounting other accessories, such as for example an EFV (Excess Flow Valve).

On the lower external part of the internal element 21 there is instead provided at least one annular seat 29 (two in the embodiments shown in the drawings) suitable for accommodating a respective sealing gasket 31, for example in particular an O-ring, which comes into contact with the internal surface of the neck 11 of the core 10 of the cylinder 1.

The neck 11 of the core 10 has an annular edge 12 and a slight narrowing of diameter starting from its mouth, such as to determine an inclined or conical internal surface 13 suitable for coupling with a corresponding external conical surface 34 of the internal element 21 of the nozzle 20, and a conical external surface 14 suitable for coupling with a corresponding conical internal surface 41 of the elastomeric or plastic ring 40 placed between the neck 11 and the external element 22 of the nozzle 20.

The provision of the ring 40 becomes necessary in that a possible conicity formed directly on the internal surface of the external element 22 would make mounting thereof impossible on the neck 11 which would be presented as undercut.

Figure 8:
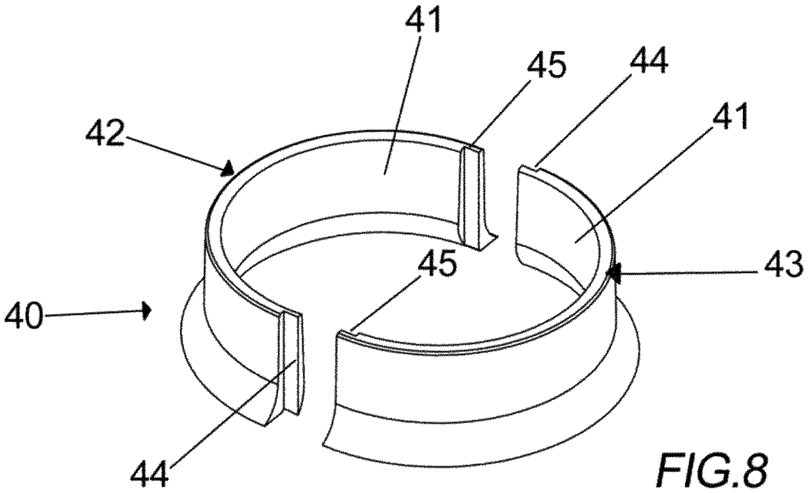
FIG. 8 is an axonometric view of the modular ring.

In fact the ring 40, in order to be able to be fitted around the neck 11, is formed in two separate parts 42, 43, which can be seen more clearly in the axonometric view of FIG. 8.

In the example given, the two parts 42, 43 of the ring 40 are perfectly identical one to the other and provided, at the respective ends, with complementary slotting means 44, 45, made up of tapers of the wall of the ring, obtained by removing material, respectively, from the exterior and from the interior of the wall itself. Obviously other slotting means could be provided, or these means could be completely absent.

The external surface of the ring 40, which can be cylindrical or slightly conical, couples with a corresponding cylindrical or slightly conical internal surface 32 of the external element 22 of the nozzle, placed below the thread 24.

Between said internal surface 32 and said thread 24 of the external element 22 an internal annular relief 33 is provided, which abuts against the edge 12 of the neck 11 of the core 10, closing the ring 40 above. Above said edge 12 of the neck 11 an external shoulder 39 of the internal element 21 of the nozzle 21 abuts.

The double conicity of the neck 11 of the core 10, together with the conicity of the internal element 21 of the nozzle and of the ring 40 below the external element 22, makes it possible to obtain an excellent mechanical coupling between core and nozzle, since the inclined surfaces increase the adhesion and the resistance to stresses in the axial direction.

The external element 22 of the nozzle 20 has a radial protrusion 38, preferably of hexagonal, octagonal or decagonal shape, for a better grip of the external surface covering 2 and to avoid possible rotations that could occur, when tightening the internal element 21 on the external element 22, and a widened base 28 that goes to rest on the upper part of the core 10 of the container 1.

Figure 9:
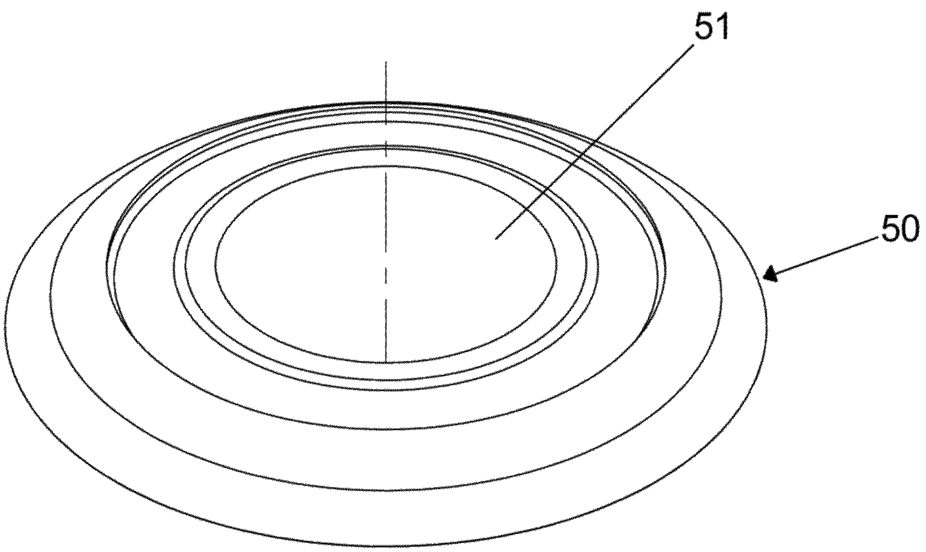
FIG. 9 is an axonometric view of the protective element.

In order to avoid a biting effect between the metallic material of the external element 22 of the nozzle 20 and the plastic material of the core 10, between this external element 22 and the core 10 said annular protective element in plastic or elastomeric material 50 is interposed, which acts as a bearing, shown axonometrically in FIG. 9.

On the opposite side to the nozzle 20, in the lower part of the core 10, a bottom 60 in metal or also plastic material is applied, with the interposition of a bearing ring 61 in plastic or elastomeric material. This bottom 60 is used to allow the winding of carbon fibre threads to make the external surface covering 2 of the cylinder.

Referring to FIGS. 3*a*, 3*b*, 4*a*-4*f* a description is now given of how the cylinder 1 is formed with the nozzle 20.

Figure 3A:
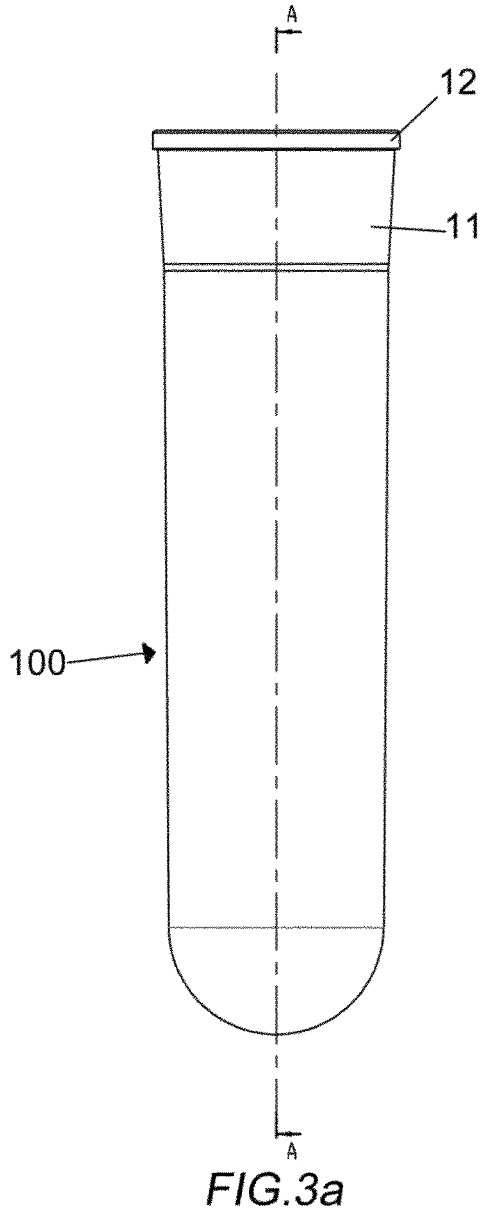
Figure 3B:
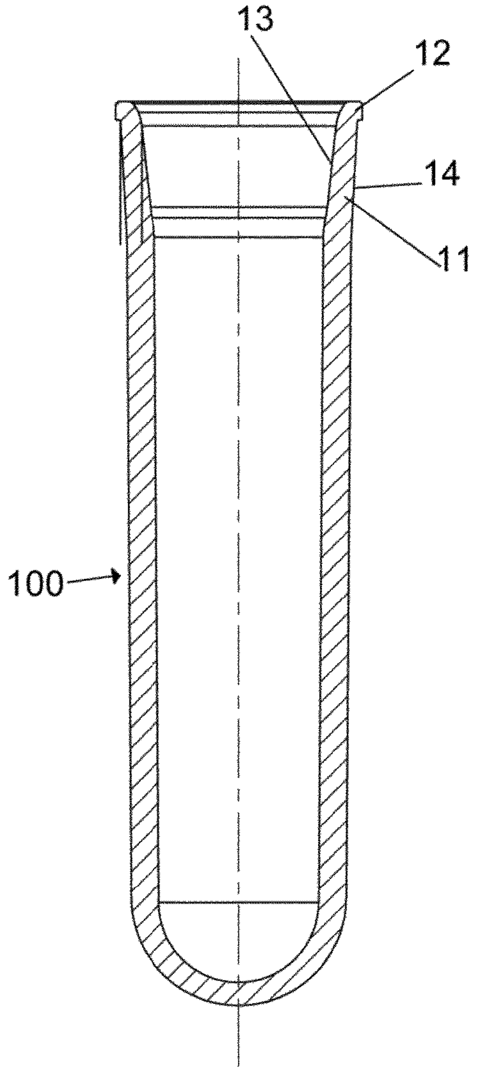

The core 10 is formed from a preform 100 shown in FIGS. 3*a* and 3*b*, in a view and section respectively.

Figure 4A:
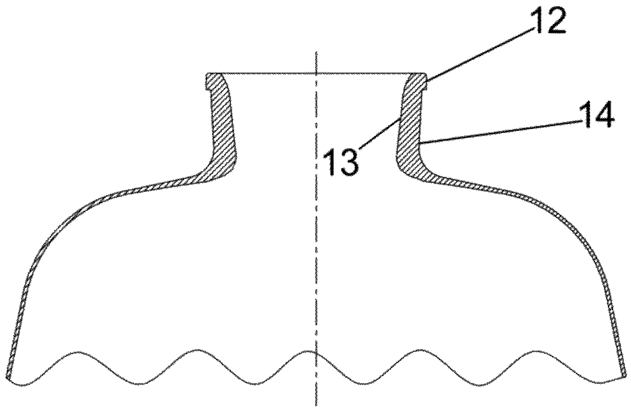

The preform 100 is stretch-blow moulded to form the core 10 of the cylinder 1, as shown partially in FIG. 4*a*.

Before the stretch-blow moulding the preform is subjected to a heat treatment during which the neck 11 of the preform, with said internal 13 and external 14 conicities, undergoes a phase change that determines a crystallization thereof allowing, after a resumption of mechanical processing, a perfect coupling with the elements of the nozzle 20.

Figure 4B:
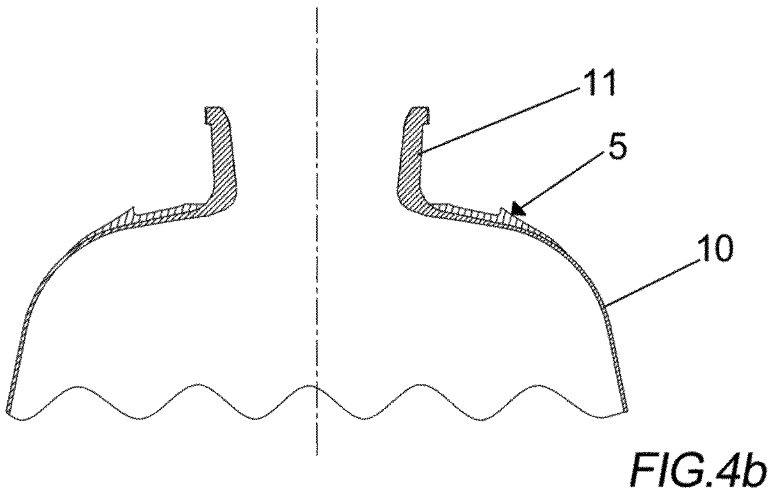

After the stretch-blow moulding of the preform the protective bearing 50 is mounted, which has a central hole 51 (FIG. 9) sufficiently large to house the neck 11 of the core 10, as shown in FIG. 4*b*.

Figure 4C:
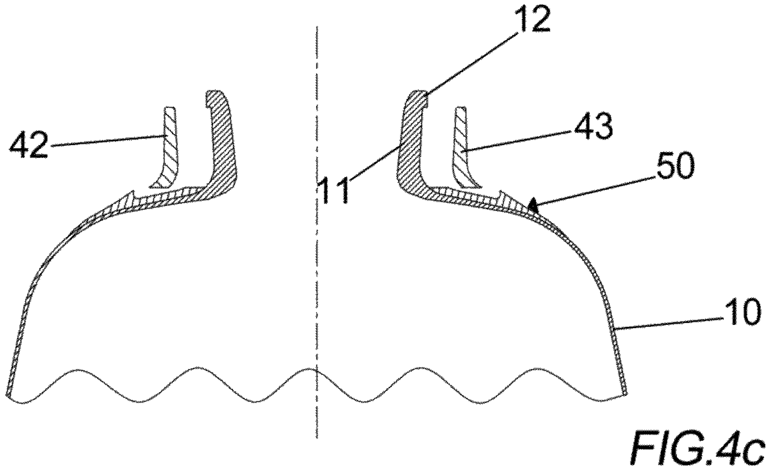
Figure 4D:
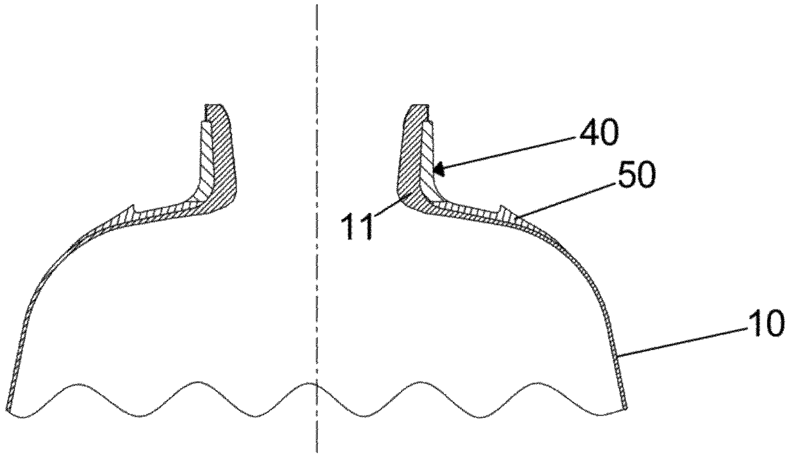

The two parts 42, 43 of the ring 40 are then mounted around the neck 11, as shown in sequence by FIGS. 4*c* and 4*d*.

Figure 4E:
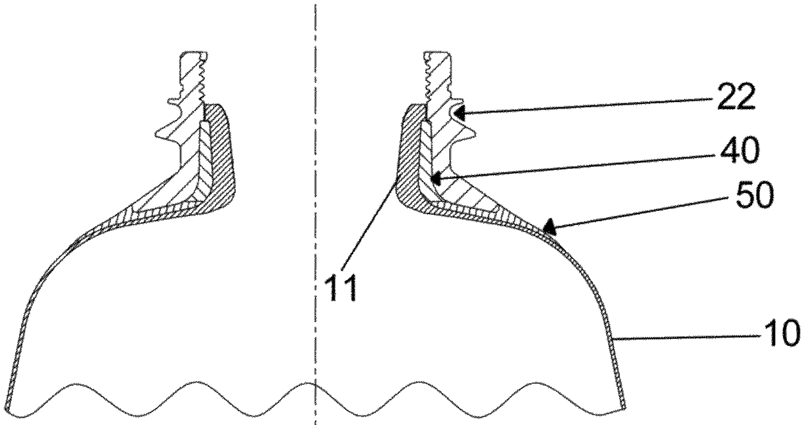
Figure 4F:
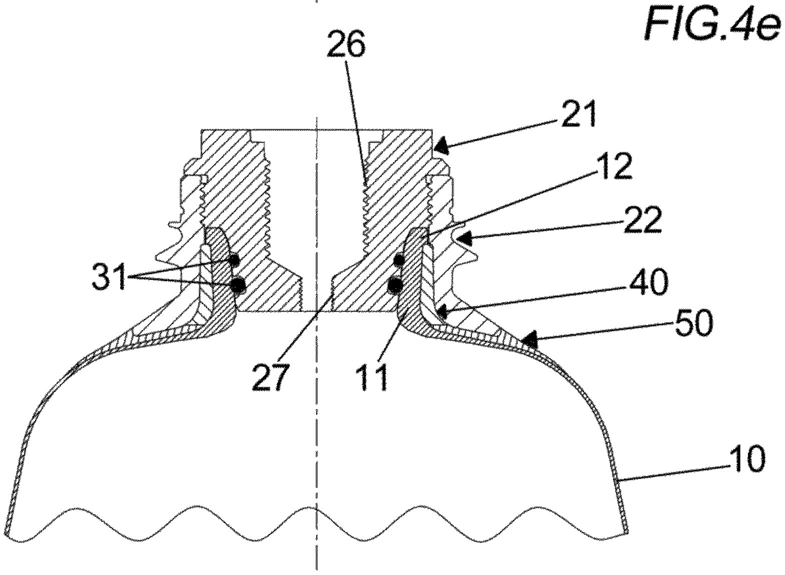
Figure 5:
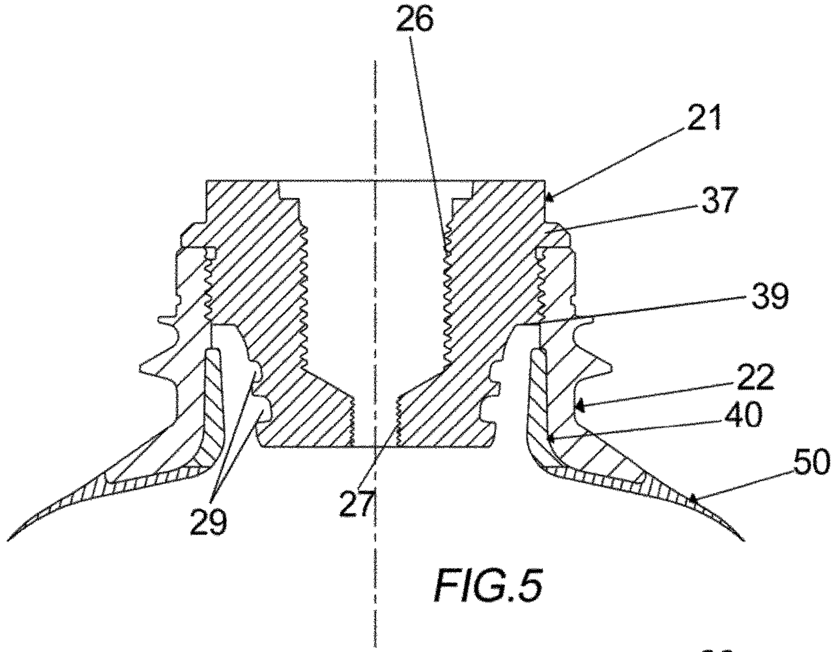

Subsequently the external element 22 of the nozzle is mounted, as shown in FIG. 4*e*. At this point, after application of the bottom 60 on the core 10, carbon fibre threads can be wound in order to realize the external surface covering 2 of the cylinder which partially incorporates the external element 22 of the nozzle 20.

Finally, the internal element 21 of the nozzle is screwed, bringing its shoulder 39 in abutment above the annular edge 12 of the neck 11.

Naturally, alternatively, the internal element 21 can be mounted prior to the winding of the surface covering 2 in composite material. In any case, the internal element 21 can be removed if necessary for reasons of maintenance or to carry out replacement of the gasket(s).

The cylinder 1 shown in the drawings has a "barrel" shape, i.e. a cylindrical shape tapered above and below, but it is clear that it can be of any desired shape, for example cylindrical with a circular section, square section, rectangular, elliptical, etc.

Figure 10:
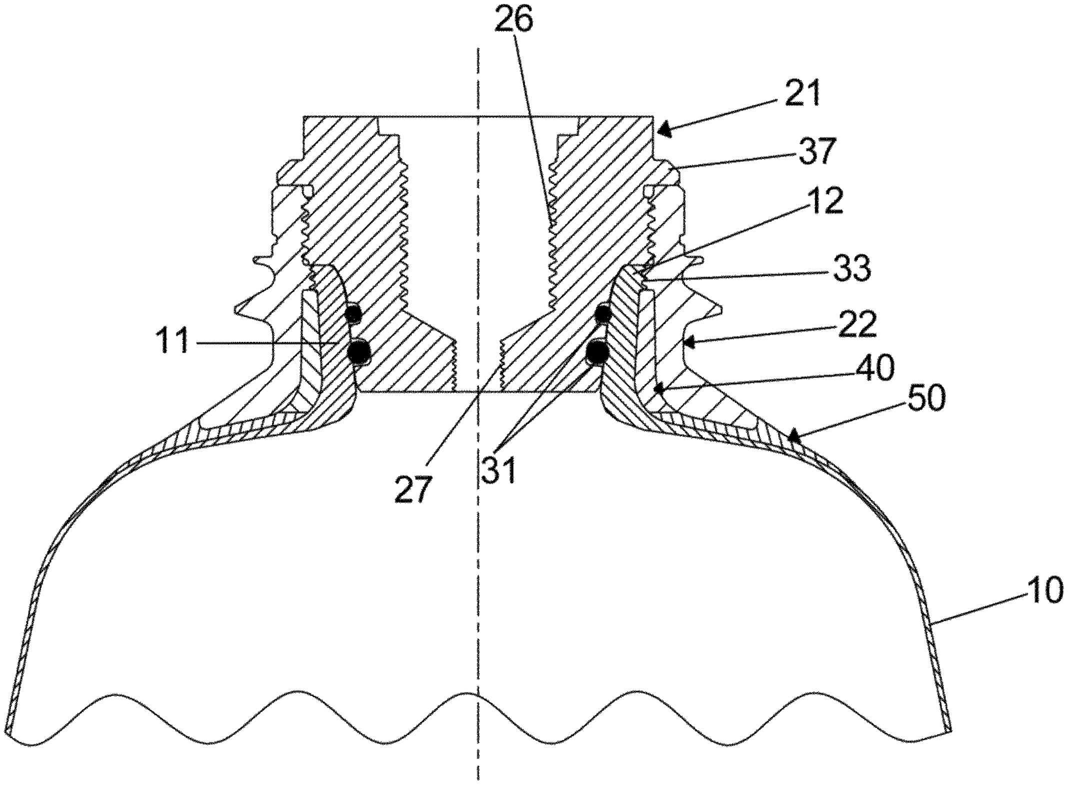
FIG. 10 is a median section view of the nozzle assembled on the core, according to an embodiment slightly different from that shown in FIG. 4*f.*

FIG. 10 shows a slightly different embodiment, in which said annular internal relief 33 of the external element 22 of the nozzle is threaded and screws onto a corresponding thread provided on the annular edge 12 of the neck 11 of the core 10, so as to ensure a firm coupling between these elements.

From what is disclosed, the advantages of the high-pressure cylinder according to the invention and of the relative manufacturing process, which enables a perfect sealed coupling of the nozzle 20 to be obtained, thanks to the double conicity of the neck 11 of the core 10, appear clear.

Naturally, the invention is not limited to the particular embodiment previously described and illustrated in the accompanying drawings, but numerous detailed changes may be made thereto, within the reach of the person skilled in the art, without thereby departing from the scope of the invention itself, as defined in the following claims.

The invention claimed is:

1. An apparatus comprising:

a cylinder having an internal core or liner of a plastic material, said cylinder having a surface covering of at least one layer of a composite material; and a nozzle applied to an upper end portion of a neck of the internal core or liner, said nozzle adapted to receive at least one accessary, said nozzle having an internal metal element and an external metal element screwable-onto each other so as to tighten on the neck of the internal core, or liner, wherein the neck has a slight narrowing of a diameter thereof from a mouth of the neck so as to define an internal conical surface coupleable with an external conical surface of the internal, metal element of said nozzle and an external conical surface coupleable to an internal conical surface of a modular ring, the modular ring positioned between the neck and the external metal element of said nozzle, the modular ring being of a plastic or elastomeric material, said nozzle having an annular protective element interposed between a widened enlarged base of said nozzle and an upper part of the internal core or liner of said cylinder, said annular protective element being of a plastic or, elastomeric material.

2. The apparatus of claim 1, wherein the modular ring is assembled from a pair of separate parts.

3. The apparatus of claim 2, wherein the pair of separate parts has complementary slots.

4. The apparatus of claim 1, wherein the neck of the internal core or liner has an annular edge abutting against an internal annular relief of the external metal element of said nozzle so as to close the modular ring.

5. The apparatus of claim 4, wherein the internal annular relief is threaded and screwed onto a corresponding thread on the annular edge of the neck.

6. The apparatus of claim 1, wherein the internal metal element of said nozzle has at least one annular seat adapted to receive a sealing gasket, the sealing gasket contacting the internal surface of the neck.

7. The apparatus of claim 1, wherein the internal-metal element has thread on an upper internal part thereof, the thread adapted to lock a valve or a tap that dispenses a fluid contained in said cylinder.

8. The apparatus of claim 7, wherein a lower internal part of the internal metal element has a thread therein adapted to mount an accessary thereto.

9. A method of producing a high-pressure cylinder, the method comprising:

forming a preform with a neck having an internal conicity and an external conicity and an annular edge, blow molding the preform so as to form a core of the high-pressure cylinder;

mounting a protective bearing to the neck of the core, the protective bearing having a central hole having a diameter suitable for housing the neck of the core;

mounting a modular ring around the neck such that an internal conical surface of the modular ring is coupled to the external conicity of the neck;

mounting an external element of a nozzle such that the modular ring is arranged between the neck and the external element; and winding fiber threads to form an external surface covering of the high-pressure cylinder to partially incorporate the external element of the nozzle, the fiber threads being of a carbon fiber or mixed fiber threads; and mounting an internal element of the nozzle, such that the internal conicity of the neck is coupled to an external conical surface of the internal element, and the annular protective bearing is interposed between a widened enlarged base of the nozzle and the upper part of the core.

10. The method of claim 9, further comprising:

heat treating the preform prior to the step of blow molding so as to phase change the neck.

11. The method of claim 9, wherein the mounting the internal element comprises screwing the internal element onto the external element of the nozzle prior to the step of winding.

12. The method of claim 9, wherein the mounting the internal element comprises screwing the internal element onto the external element of the nozzle after the step of winding.

* * * * *